(12) United States Patent
Picquenot et al.

(10) Patent No.: US 9,071,640 B2
(45) Date of Patent: Jun. 30, 2015

(54) METHOD OF SELECTING AN APPLICATION INSTALLED ON A SECURED MODULE, AN ASSOCIATED TERMINAL AND AN ASSOCIATED SECURITY MODULE

(75) Inventors: David Picquenot, Saint Contest (FR); Ahmad Saif, Caen (FR)

(73) Assignee: Orange, Paris (FR)

( * ) Notice: Subject to any disclaimer, the term of this patent is extended or adjusted under 35 U.S.C. 154(b) by 1195 days.

(21) Appl. No.: 12/602,518

(22) PCT Filed: May 29, 2008

(86) PCT No.: PCT/FR2008/050949
§ 371 (c)(1),
(2), (4) Date: Dec. 1, 2009

(87) PCT Pub. No.: WO2008/152313
PCT Pub. Date: Dec. 18, 2008

(65) Prior Publication Data
US 2010/0159905 A1    Jun. 24, 2010

(30) Foreign Application Priority Data
Jun. 1, 2007    (FR) ...................................... 07 55411

(51) Int. Cl.
*G06F 9/00* (2006.01)
*H04L 29/08* (2006.01)
*G06Q 20/34* (2012.01)
*G07F 7/10* (2006.01)

(52) U.S. Cl.
CPC .............. *H04L 67/16* (2013.01); *G06Q 20/341* (2013.01); *G06Q 20/3552* (2013.01); *G06Q 20/3563* (2013.01); *G06Q 20/3576* (2013.01); *G07F 7/1008* (2013.01)

(58) Field of Classification Search
CPC ..... G06F 8/61; H04M 1/72525; H04W 4/001; H04W 12/08; H04W 12/00
USPC ............... 455/410, 412, 414.1, 418; 235/380; 709/201–203, 206, 211, 209, 216, 222, 709/237
See application file for complete search history.

(56) References Cited

U.S. PATENT DOCUMENTS 6,961,587 B1    11/2005    Vilppula et al.
2002/0040349 A1*    4/2002    Takayama ....................... 705/57
(Continued)

FOREIGN PATENT DOCUMENTS

FR          2 878 677 A1      6/2006
WO      WO 01/18746 A1      3/2001

*Primary Examiner* — Quan M Hua
(74) *Attorney, Agent, or Firm* — Drinker Biddle & Reath LLP

(57) ABSTRACT

The invention consists in a method of selecting an application from a plurality of applications installed in a security module, which method is adapted to dialogue with a communicating device and includes a preliminary configuration step (E0) including a step of determining at least one group of applications with which a group identifier is associated, a step of determining one application per group, and a step of storing configuration information representing the association of a particular application and the identifier of the corresponding group, step (E1) of receiving a selection instruction containing a group identifier sent by the communicating device, and a step (E2) of selecting the application associated with the received group identifier as a function of the stored configuration information. The invention also consists in a security module and a terminal.

11 Claims, 3 Drawing Sheets

(56) References Cited

U.S. PATENT DOCUMENTS

2004/0087273 A1  5/2004  Perttila et al.
2004/0232247 A1  11/2004  Tsunoda et al.
2009/0020603 A1* 1/2009  Foesser .................. 235/380

* cited by examiner

METHOD OF SELECTING AN APPLICATION INSTALLED ON A SECURED MODULE, AN ASSOCIATED TERMINAL AND AN ASSOCIATED SECURITY MODULE

CROSS-REFERENCE TO RELATED APPLICATIONS

This application is the U.S. national phase of the International Patent Application No. PCT/FR2008/050949 filed May 29, 2008, which claims the benefit of French Application No. 07 55411 filed Jun. 1, 2007, the entire content of which is incorporated herein by reference.

FIELD OF THE INVENTION

The present invention relates to the field of telecommunications and more particularly to that of selecting applications hosted by a secured element of a mobile terminal.

BACKGROUND OF THE INVENTION

Most existing mobile terminals can be used not only to set up telephone calls but also to execute a plurality of applications downloaded into a secured module connected to the terminal. This security module can be a memory module of the terminal or a removable medium (for example a subscriber smart card) inserted into the terminal.

Such applications function in slave mode, i.e. an application is executed only when it receives a selection instruction. This selection instruction, sent by a communicating device known as a station, contains a parameter in the form of an identifier of the application to be selected.

Accordingly, a station located in the vicinity of the mobile terminal seeking to effect a transaction via an application installed in the security module of that mobile terminal sends a selection instruction containing the identifier of that application.

At present, these stations in principle know only one identifier corresponding to the service to be rendered, for example a payment identifier if the station is a payment station.

With the increase in the capacities of security modules, it is now possible to store a plurality of applications in the same security module, including a plurality of applications of the same type with different identifiers. The station can interrogate the security module by sending a specific command ("list applications" ADPU command) and obtain in return a list of identifiers of applications present in the security module. The station can then select one of those applications. The choice is therefore effected by the station.

The carrier of the mobile cannot intervene in this choice. This causes a problem when a plurality of equivalent applications are installed in the security module. In the payment field, for example, the holder of a mobile terminal who is a customer of a bank A and of a bank B and has installed in the security module connected to their mobile terminal an application A for transactions effected on their account with the bank A and an application B for transactions effected on their account with the bank B cannot assign preference to application A.

SUMMARY OF THE INVENTION

The present invention alleviates this problem by proposing an application selection method taking into account the preferences of the user.

To this end, the present invention proposes a method of selecting an application from a plurality of applications installed in a security module, which method is adapted to dialogue with a communicating device and is characterized in that it includes:
 a preliminary configuration step including a step of determining at least one group of applications with which a group identifier is associated, a step of determining one application per group, and a step of storing configuration information representing the association of a particular application and the identifier of the corresponding group;
 a step of receiving a selection instruction containing a group identifier sent by the communicating device; and
 a step of selecting the application associated with the received group identifier as a function of the stored configuration information.

Thus the method of the invention allows the user to determine the application that must be selected from a set of applications of the same type. This method has the advantage that it can function without modification of the communicating devices or stations.

In one particular implementation, during the selection step the selection instruction received is modified and then forwarded to the application associated with the group identifier.

In one particular implementation, the step of determining at least one group of applications includes a step of installing in the security module at least one group application, the group identifier then being the identifier of the installed application.

This implementation limits the modifications that have to be made to the operating system of the secured module.

This particular implementation can further have one or more of the following features:
 the selection step includes a step of selecting the group application and a step of receiving from the group application the identifier of the application to be selected;
 the selection step further includes a step of receiving from the group application a redirection command advising redirection of the application.

In one particular implementation each group of applications contains applications from the same service field (payment, transport, etc.).

The invention also provides a security module including storage means adapted to cooperate with configuration means to store configuration information representing the association of a particular application and the identifier of the corresponding group, means for receiving a selection instruction including a group identifier, and means for selecting an application associated with the received group identifier.

The invention further provides a terminal adapted to function with a security module as described above including configuration means including means for determining at least one group of applications with which a group identifier is associated and means for determining one application per group.

The invention further relates to a computer program product including instructions for executing the steps of the method described above when it is loaded and executed by the security module.

BRIEF DESCRIPTION OF THE DRAWINGS

Other features and advantages of the present invention become apparent in the course of the following description of one implementation, which is given by way of non-limiting example with reference to the appended drawings, in which.

DETAILED DESCRIPTION

Figure 1:
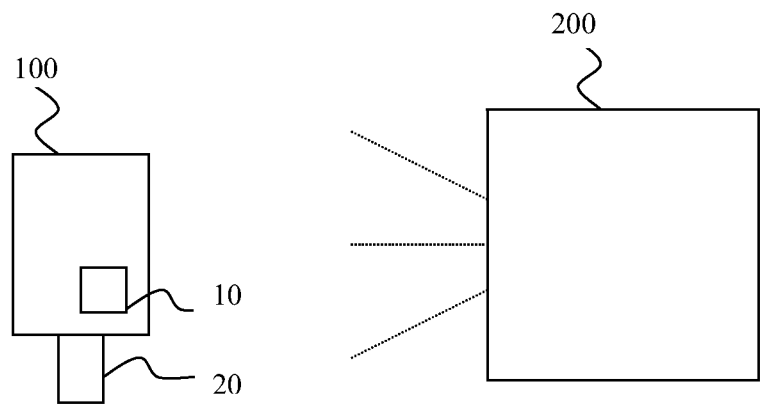
FIG. 1 is a general diagram of the context of the invention.

Referring to FIG. 1, a user has a mobile terminal 100 on which a plurality of applications have been installed. This mobile terminal is a mobile telephone or a personal digital assistant (PDA), for example.

This mobile terminal 100 includes a contactless communications module 10 allowing dialogue between the terminal 100 and a device 200 referred to below as the contactless station. The contactless module is compatible with near field communication (NFC), for example.

The mobile terminal 100 also includes a secured module 20 that is a subscriber card of the universal integrated circuit card (UICC) type.

Alternatively, this module can be a secured memory area of the mobile terminal or a removable medium of another type (for example a SIM subscriber card or a memory card hosting a secured element (SD card, embedded secure controller, etc.)).

One or more applications (AP1, AP2, etc.) are stored in the memory of the subscriber card. These applications include one or more contactless applications and use the contactless module 10.

A payment application is one such application, for example. That application will then be used each time that the holder of the mobile holds the mobile terminal up to a payment station 200. On each use, dialogue between the application stored in the subscriber card 20 and a contactless station 200 effects a payment transaction. This dialogue between the secured module 20 and the contactless station 200 is effected via the contactless module 10.

The contactless terminal 200 emits a magnetic field. When the user of the mobile is in front of the station 200, their mobile terminal enters the magnetic field emitted by the station. A transaction is then effected between the station 200 and the selected application present in the secured module of the mobile terminal.

To be more precise, when the mobile terminal enters the magnetic field of the contactless station, the contactless module receives from the contactless station a selection (select AID) message MS containing an identifier and forwards it to the secured module. On reception of this message MS, the secured module executes the method of the invention described with reference to FIG. 3. The identifier contained in the message MS is a group identifier of applications present in the security module with which an application identifier has been associated. The method of the invention allows transfer of this selection instruction to the application chosen by the user for this group of applications.

Messages are exchanged between the contactless module and the secured module in the conventional way, for example using the single wire protocol (SWP) or the SigIn-SigOut-Connection ($S^2C$) interface. Messages depending on the application selected are exchanged between the application and the contactless station.

Figure 2:
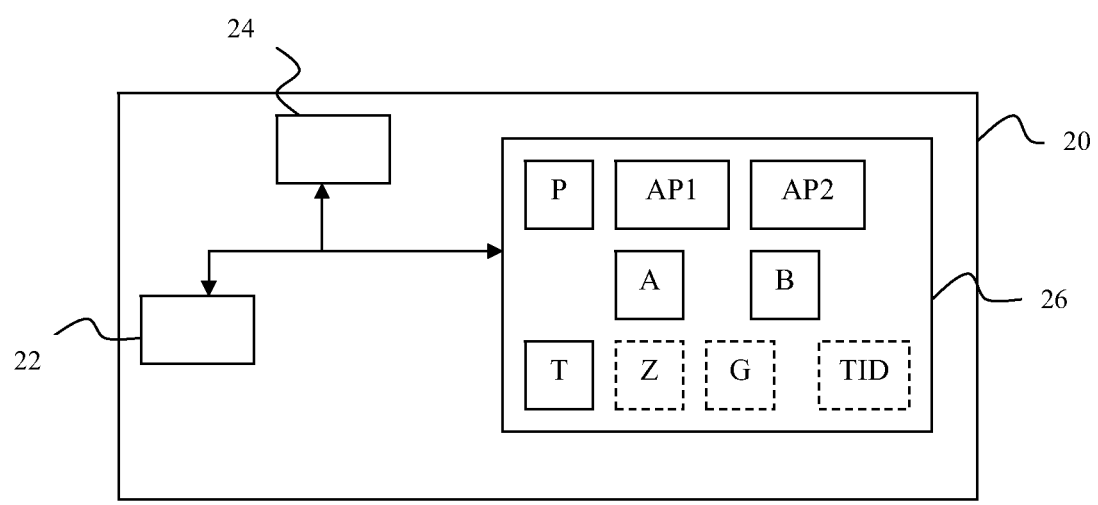
FIG. 2 is a block diagram of a security module of the invention.

Referring to FIG. 2, the security module includes a microprocessor 22, a transceiver module 24, and one or more memories 26 of ROM or EEPROM type storing programs that can be executed by the microprocessor 22. These programs include a main program P (card operating system (OS)) and one or more applications (AP1, AP2, A, B, etc.).

The operation of the security module 20 on reception of a selection instruction from the station is described in more detail below. When the card is powered up and/or no application has been selected, the microprocessor of the card executes the main program P. When the transceiver module 24 of the card receives an instruction message MS containing a selection instruction, that instruction is forwarded to the microprocessor and is processed by the main program P. According to the ISO standard 7816-4, this instruction is of the form CLA-INS-Parameters. The program P determines that this is a selection instruction by reading the INS byte. The Parameters bytes contain an identifier that according to the invention is a group identifier, in contrast to prior art methods where this identifier is that of a particular application.

Figure 4:
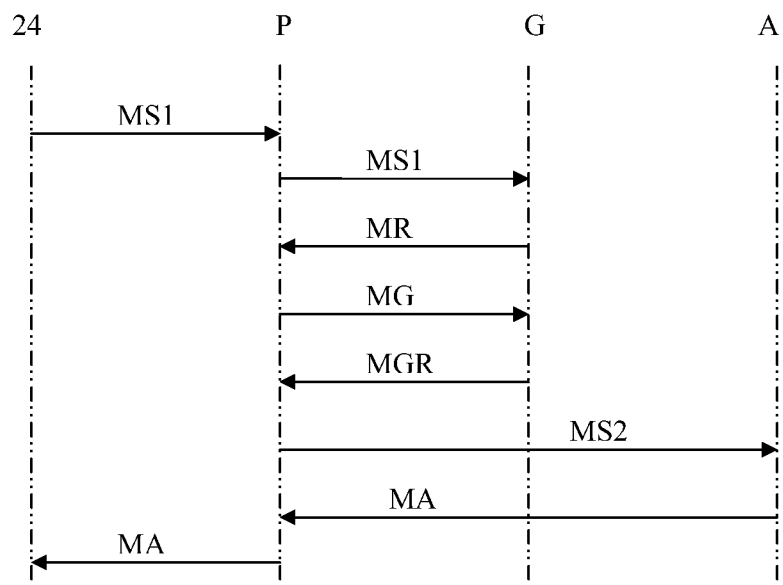
FIG. 4 is a diagram of the various steps of a method conforming to a first implementation of the invention.
Figure 5:
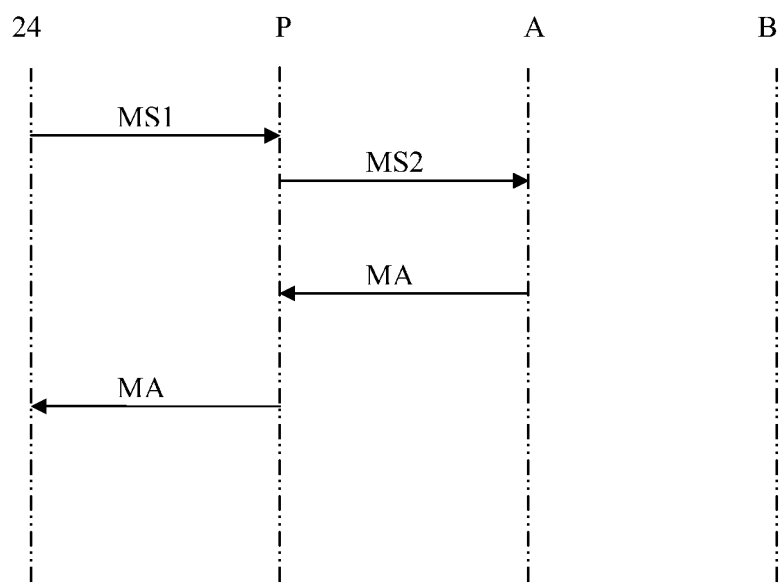
FIG. 5 is a diagram of the various steps of a method conforming to a second implementation of the invention.

Interaction between the program P, the applications and the storage areas of the card are described in detail with reference to FIGS. 4 and 5, which show two implementations of the invention.

Figure 3:
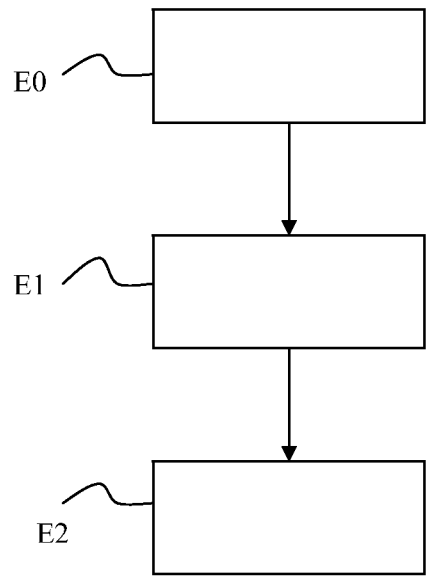
FIG. 3 is a diagram of the various steps of the method of the invention.

One implementation of the invention is described below with reference to FIG. 3.

In this implementation, at least two payment applications A and B are stored in the memory of the security module. The application A is a payment application of the bank A, for example. The application B is an application of the bank B. Alternatively, the applications A and B are transport applications of two different towns. The applications A and B are equivalent in terms of service and are therefore considered as belonging to the same group G.

The user prefers their payment transactions to be effected on the account that they have with the bank A and not on the account that they have with the bank B. Accordingly, in a preliminary configuration step E0, the user configures the security module to indicate their preferences to it.

In a first sub-step E01, a group G of applications containing the applications A and B is constructed. A group identifier IdG is associated with this group G.

The identifier is preferably an identifier already used by the stations. It is therefore not necessary to modify the stations to implement the invention.

In a second sub-step E02, using a menu displayed and selected on the screen and keypad of the mobile terminal, the user indicates this preference by selecting application A.

After this selection, the terminal sends the security module information enabling it to identify the particular application A, for example the identifier IdA. Then, in a sub-step E03, the security module stores configuration information representing the association of that particular application with the corresponding group identifier.

In one implementation, the configuration information is the identifier IdA of the particular application and is stored in a memory area dedicated to the corresponding group G. Alternatively, the configuration information is the address of the application A in the security module.

In another implementation, the configuration information comprises the identifier IdA of the selected application and the identifier of the corresponding group G.

This configuration information remains stored in the memory area until the user modifies their choice.

In a subsequent phase, during a step E1, the station sends the mobile terminal a message MS1 that contains a selection instruction (SELECT). The identifier IdG contained in this selection instruction is that of the group G which, in an implementation of the invention described with reference to FIG. 4, is an identifier of a group application also referred to as the root application. The step E1 is followed by a selection step E2 in which the secured module selects the application A according to the configuration information stored during a preliminary step E0.

One particular implementation of the selection step is described below with reference to FIG. 4.

In this implementation, an application G whose identifier is IdG has been downloaded using a mobile terminal. This application G is downloaded in the same conventional way as downloading existing applications known to the person skilled in the art.

During the configuration step E0, the identifier IdA of the selected application A is stored in a memory area Z dedicated to the application G.

Following reception of the selection instruction message MS1, the program P determines the address of the application G corresponding to the received identifier IdG by reading a correspondence table T where the addresses of the applications present on the card are stored. The program P launches the execution of this application G by sending the message MS1 to the application G.

The application G then reads in the memory Z the value of the identifier IdA corresponding to the application A chosen by the user during the configuration phase E0.

It then sends a REDIRECT message MR to the program P. This message informs the program P that the selected application G is a group application. For example this message has the same structure as an acknowledgement message. According to the ISO standard 7816-4, an acknowledgement message comprises two status bytes. This standard also lists the possible values for this pair of bytes. For example, the redirection message could consist of a pair of bytes not includes in the list of possible values for the acknowledgement message, such as "AF-XX".

The program P analyzes this message MR and determines that it is a redirection message and not an acknowledgement message. The message MR is therefore not forwarded to the station.

The program P then sends a message MG to the group application G to request the identifier IdA of the application A to be selected. This message MG is an ISO standard 7816-4 GET RESPONSE message, for example, containing the byte XX received in the message MR as a parameter.

Following reception of this instruction message MG, the application G sends the program P a message MGR containing the XX bytes representing the identifier IdA of the application A read in the memory Z.

Alternatively, the identifier IdA is read in the memory Z, not on reception of the SELECT message MS1 by the application G but after the REDIRECT instruction is sent or when the GET RESPONSE instruction is received.

Using this identifier IdA received in the message MGR and the correspondence table T, the program P determines the address of the application A corresponding to the identifier IdA.

It composes and then sends the application A a SELECT message MS2 that contains an instruction for selecting the application A. This message MS2 corresponds to the message MS1 received with the identifier IdG replaced by the identifier IdA.

The selected application A responds to the program P with an acknowledgement message MA1 conforming to the ISO standard 7816-4. This message MA1 is sent to the station by the program P.

The program P then waits for a new instruction from the station, which it then forwards directly to the application A, until a new SELECT instruction is received.

In another implementation, the message MGR in response to the GET RESPONSE message MG contains the identifier IdA of the application A and the address of the application A read from the correspondence table T. On reception of the message MGR, the program P sends the message MS2 to the address contained in the message MGR. A plurality of application groups can be constructed during the configuration phase. One memory Z is used for each group G of applications. A group application is downloaded to the security module for each group.

In the special circumstance where a group contains only one application, it is not necessary to download a group application for that group. In this circumstance, this application is selected as in the prior art.

A second implementation of the invention is described with reference to FIG. 5.

In this implementation, a table TID contains all the group identifiers IdG and, in corresponding relationship to each group identifier, the identifier of an application to be selected. This table TID is stored in a memory 26 of the secured module. During a step E0 of configuration by the user, the identifier of the application chosen by the user is stored in the table TID in corresponding relationship to the group identifier concerned.

On reception of a SELECT message MS1, the main program P of the secured module looks up in the table TID whether the identifier received is present in the table as a group identifier. If the group identifier received is present in the table, the program P recovers from this table TID the group identifier IdA.

The program P can then recover the address of the application identifier IdA in the table T and send to the address recovered in this way a SELECT message MS2 containing the identifier IdA.

Alternatively, the table TID contains all the identifiers of the applications installed in the security module and all the group identifiers. There is stored in corresponding relationship to each group identifier an identifier of an application from that group and in corresponding relationship to an identifier of an application that is not a group application is stored the identifier of that application.

On reception of a selection instruction, the program P reads in the table TID the identifier of the application to be selected, determines the address of the application linked to that application, and sends a selection instruction containing the identifier read in the table TID to the corresponding address. Thus the processing effected is the same regardless of the type of identifier received (group or other identifier).

The security module 20 can contain a plurality of applications divided into a plurality of groups; for example, a group G1 of three payment applications and a group G2 of two transport applications. During the preliminary step E0, the user selects an application for each particular group. The storage step consists in storing the identifier of the selected application in corresponding relationship to the identifier of the particular group. The security module thus stores as many (group application identifier—identifier of application to be determined) pairs as there are groups.

On initialization of the card or on installation of a group application, a default application identifier is associated with a group identifier.

In one implementation, the list of applications belonging to a group is determined by the user and is displayed at the time of a group configuration request, and the user must choose from this list.

In another implementation, the groups are not predetermined and the user selects the preferred application for a group from all the applications present in the security module.

The invention has been described in relation to a mobile terminal containing contactless applications, dialogue between the terminal and the station being effected via a contactless module.

The invention is equally applicable if dialogue between the terminal and the station uses some other means of communication, for example a cable connection.

The invention applies equally to smart cards inserted directly into a reader, for example, an electronic payment terminal (EPT) or an automated teller machine (ATM).

The invention claimed is:

1. A method of automatically selecting an application from a plurality of applications installed in a security module, said method being adapted to dialogue with a communicating device and comprising the following steps:
    a preliminary configuration step comprising a step of determining at least one group of a plurality of applications with which a group identifier is associated, a step of determining by a user one unique particular application of said plurality of applications per group, and a step of storing configuration information matching only said one unique particular application per group and the identifier of the corresponding group;
    a step of receiving a selection instruction containing a group identifier sent by the communicating device; and
    a step of automatically selecting said one unique particular application on the basis of the matching of the unique particular application with the received group identifier in the stored configuration information, including:
        analyzing the selection instruction to recognize that it is a group instruction; and
        obtaining the identifier of the matched particular application.

2. The method according to claim 1, wherein during the application selection step the selection instruction received is modified and forwarded to the application matched with the group identifier.

3. The method according to claim 1, wherein the step of determining at least one group of applications comprises a step of installing in the security module at least one group application, the group identifier then being the identifier of the installed application.

4. The method according to claim 3, wherein the selection step comprises a step of selecting the group application and a step of receiving from the group application the identifier of the application to be selected.

5. The method according to claim 4, wherein the selection step further comprises a step of receiving from the group application a redirection command advising redirection of the application.

6. The method according to claim 1, wherein the group of applications consists of applications from the same service field.

7. A security module comprising:
    means for storing at least one group of applications, said group comprising a plurality of applications adapted to dialogue with a communicating device;
    storage means adapted to cooperate with a configuration means to store configuration information matching only a unique particular one of said plurality of applications and the identifier of the corresponding group, said particular one of said plurality of applications being selected by a user;
    means for receiving a selection instruction including a group identifier; and
    means for selecting said particular one of said plurality of applications associated with the received group identifier, wherein the selecting includes analyzing the selection instruction to recognize that it is a group instruction, and obtaining the identifier of the matched particular application.

8. A security module for a terminal according to claim 7 comprising configuration means and further comprising means for determining at least one group of applications with which a group identifier is associated and means for determining one application per group.

9. A method according to claim 1 implemented on a non-transitory computer program product when it is loaded and executed by a security module.

10. A security module according to claim 8, wherein the security module is a secured memory unit of said terminal.

11. A security module according to claim 8, wherein the security module is a removable medium.

* * * * *